March 22, 1938. P. W. STEPHENS 2,111,997
JUICE EXTRACTOR
Filed July 27, 1936
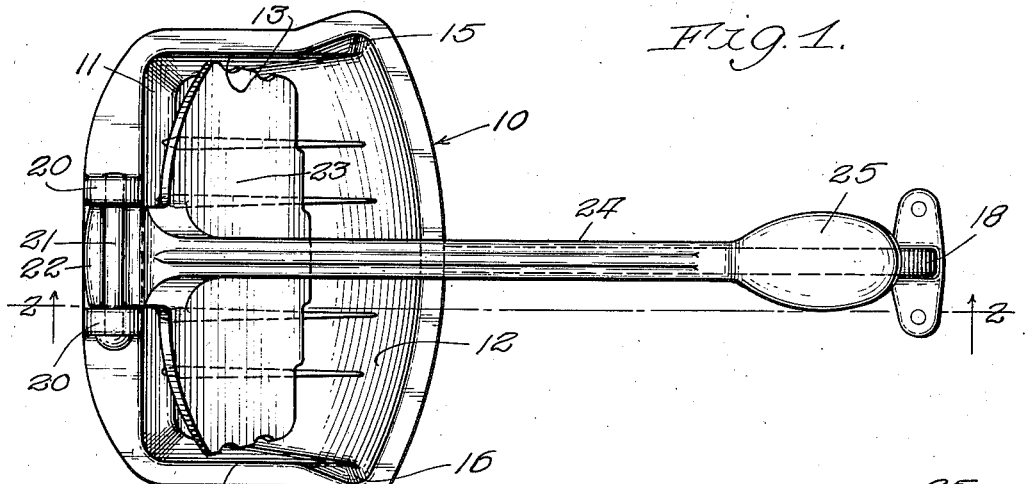
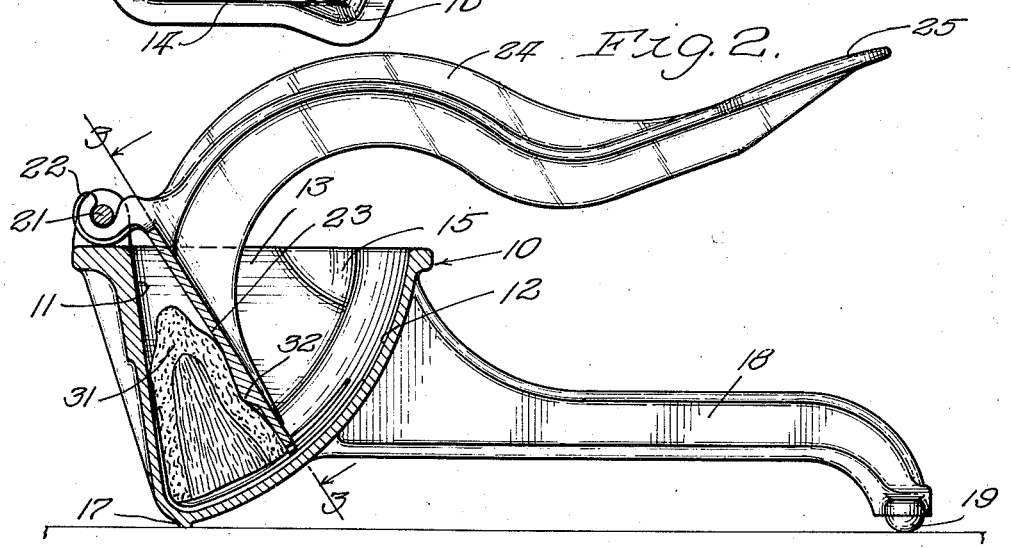
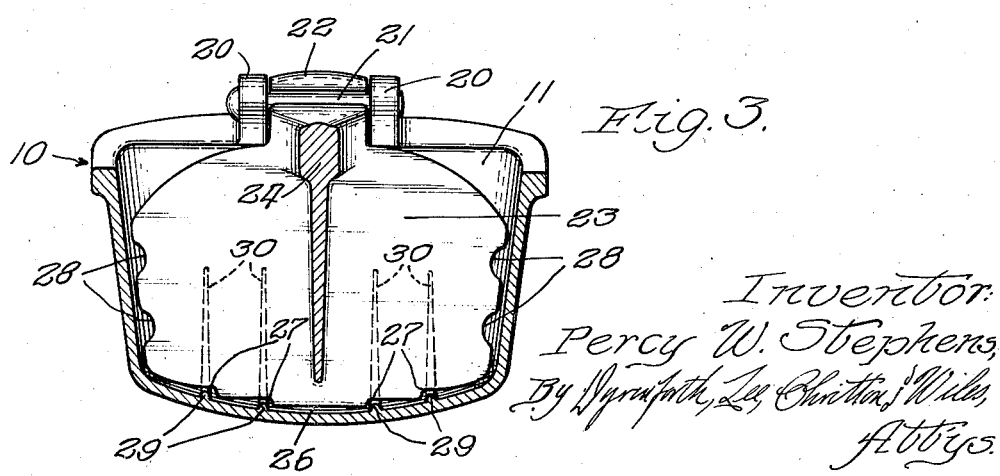
Inventor:
Percy W. Stephens,
By Dyrenforth, Lee, Chritton & Wiles,
Attys.

Patented Mar. 22, 1938

2,111,997

UNITED STATES PATENT OFFICE 2,111,997

JUICE EXTRACTOR

Percy W. Stephens, Chicago, Ill.

Application July 27, 1936, Serial No. 92,881

2 Claims. (Cl. 100—41)

This invention relates to a juice extractor, and more particularly to a device of the type wherein the fruit is squeezed between a presser plate and an abutment.

One feature of this invention is that it comprises only two parts; another feature of this invention is that no screen or sieve is necessary; yet another feature of this invention is that it is easy to clean, with no slots or holes to clog up; other features and advantages of this invention will be apparent from the following specification and the drawing, in which:—

Figure 1 is a top plan view of the device; Fig. 2 is a side elevation, partly in section, along the line 2—2 of Fig. 1; and Fig. 3 is a sectional view along the line 3—3 of Fig. 2.

While juice extractors of the type wherein the fruit is squeezed between a presser plate, operated by a handle, and an abutment have been known and used for some time, they have been open to various objections. The principal objection is the fact that they are provided with a screen or sieve portion cooperating with the presser plate and through which the juice passes. While this is advantageous in that it prevents seeds and pulp from remaining in the juice, it is highly objectionable in that it requires an extra removable part and results in narrow slots or openings which frequently clog. The screen or sieve has to be removed from the device each time after it is used, and flushed with water or otherwise cleaned.

In the particular embodiment of this invention disclosed herein no strainer part is used, the presser plate cooperating directly with the bowl. In order to permit the juice to pass from one side of the presser plate to the other the plate is notched along the edge adjacent the bowl. The portion of the bowl with which this notched edge cooperates has ridges formed thereon parallel to the direction of motion of the edge of the presser plate and so placed as to register with the notches in that edge. These ridges serve the dual function of keeping the skin or rind of the fruit slightly spaced from the bowl and of sufficiently closing the notches in the presser plate so that a seed cannot pass through from one side of the plate to the other.

Referring more particularly to the drawing of the embodiment of this invention disclosed therein, a juice extractor is shown with a bowl 10 having a substantially straight abutment portion 11, an arcuate portion 12, and two substantially vertical side portions 13 and 14. The bowl has formed at the junction of the bowl 12 and the side 13 a pouring lip 15; and a similar pouring lip 16 is provided on the other side. The bowl has a stand portion 17 and an extension 18 terminating in resilient buttons 19 so that it may conveniently be placed on a table or other plane surface.

The top of the abutment portion 11 has extending thereabove bracket members 20 with a horizontal pivot or shaft 21 therebetween. This pivot is adapted to be engaged by a hook 22 on the presser plate 23 of the device. The presser plate 23 has formed therewith a lever 24 terminating in a handle 25 adapted to permit manual movement of the presser plate against resistance.

The presser plate 23 extends substantially to both side portions and to the arcuate portion so that the edge 26 moves immediately adjacent the arcuate portion, but slightly spaced therefrom, when the plate is rotated about the pivot 21. The edge 26 is notched, shown here as having four notches 27. It may also be provided with notches 28 adjacent the sides of the bowl. The arcuate portion of the bowl follows a curve having the pivot 21 as a center point thereof, so that the spacing between the notched edge 26 of the presser plate 23 and the arcuate portion 12 of the bowl does not change during movement of the presser plate. This arcuate portion is provided with ridges or raised portions 29 parallel to the direction of movement of the edge 26 and so placed as to register with the notches 27. These ridges 29 may, if desired, be extended up the abutment portion, as by the extensions 30.

Referring more particularly to Fig. 2, a piece of fruit having seeds, as a half of a lime 31, is shown in place in the device and partly squeezed. It will be noted that the presser plate 23 is provided with a projecting portion 32 which helps to prevent the slipping of the lime upwards during pressure. As pressure is applied to the handle 25 and the presser plate 23 is moved closer to the abutment portion 11, the lime 31 is squeezed to force the juice therefrom. This squeezing, of course, forces some of the seeds therefrom also, and it is undesirable to have these seeds mix with the juice. The notches 27 along the edge of the presser plate, and the slight space extending between the presser plate and the arcuate portion 12, permit the juice to pass from one side of the presser plate to the other, but the spacing is such that the ridges 29 prevent the passage of any seeds from one side of the plate to the other. Thus the fruit may be squeezed until practically all of the juice has been extracted therefrom, which juice will then be in the bowl on the exposed side of the presser plate, and the device may then be tipped up and back to pour the juice from one of the lips, as 16. The seeds, however, will remain on the side of the plate with the fruit, and thus not pass out with the juice.

When the juice has been removed from the fruit 31, the handle 25 may be turned back, the hook 22 conveniently removed from the pivot 21, and the fruit and seeds dumped out of the bowl. This may then be held under running water to flush it, if desired. It will be readily apparent that there are no narrow slots or portions tending to become clogged with seeds or pulp, and no separate screen member which must be removed in order to clean the bowl. The hook method of attaching the presser plate to the pivot 21 provides a positive connection while the plate is in operative position yet enables it to be readily removed for cleaning purposes. The entire device forms a juice extractor which is convenient to use, has a minimum of separate parts, and may be very easily cleaned.

While I have described and claimed certain embodiments of my invention it is to be understood that it is capable of many modifications. Changes therefore, in the construction and arrangement may be made without departing from the spirit and scope of the invention as disclosed in the appended claims, in which it is my intention to claim all novelty inherent in my invention as broadly as permissible, in view of the prior art.

I claim:

1. A device of the character described for extracting juice from fruit having seeds, including: a bowl having an arcuate portion, a substantially straight abutment portion, and two substantially straight side portions; a presser plate pivotally mounted near the top of said abutment portion and having a notched edge adapted to move immediately adjacent but slightly spaced from said arcuate portion, the spacing of said edge between said notches being small enough to prevent the passage of a seed therethrough; and ridges on said arcuate portion parallel to the direction of motion of the edge of said presser plate, said ridges registering with said notches, whereby a seed is prevented from passing therethrough.

2. Apparatus of the character claimed in claim 1, said notches in said edge being substantially triangular, the apexes of said triangles being far enough from said arcuate portion to permit the passage of a seed were it not for said ridges which substantially register therewith, and said arcuate portion and a side portion having a pouring lip at the upper edge thereof at the junction of said arcuate portion and said side portion.

PERCY W. STEPHENS.